United States Patent [19]

Perrichot et al.

[11] 4,365,850
[45] Dec. 28, 1982

[54] CLUTCH THRUST BEARING UNIT WITH GUIDED ELASTIC SELF-ALIGNMENT

[75] Inventors: Daniel Perrichot, Guyancourt; Maurice Faurie, Alfortville, both of France

[73] Assignee: SKF Compagnie d'Applications Mecaniques, Clamart, France

[21] Appl. No.: 229,234

[22] Filed: Jan. 28, 1981

[30] Foreign Application Priority Data

Feb. 1, 1980 [FR] France .................. 80 02278

[51] Int. Cl.³ .......................................... F16C 19/10
[52] U.S. Cl. ........................... 308/26; 308/184 A; 308/233; 308/235
[58] Field of Search ............ 308/26, 233, 235, 236, 308/230, 176, 184 R, 184 A

[56] References Cited

U.S. PATENT DOCUMENTS

| | | | |
|---|---|---|---|
| 4,013,327 | 3/1977 | Kunkel et al. | 308/233 |
| 4,080,019 | 3/1978 | Flaissier et al. | 308/235 |
| 4,181,380 | 1/1980 | Vinel et al. | 308/233 |
| 4,267,913 | 5/1981 | Ernst et al. | 308/233 |

*Primary Examiner*—Lenard A. Footland
*Attorney, Agent, or Firm*—Beveridge, DeGrandi & Kline

[57] ABSTRACT

Clutch thrust bearing unit with guided elastic self-alignment.

Elastic means 17 are inserted between a cylindrical part 18 of the guide sleeve and the inner ring (1) of the rolling bearing. The inner ring 1 has a radial arm 5 in rubbing contact with a radial annular guide section 20 fixed to the part 18. The annular portion 20 comprises a flange 24 fitted with rounded ends 25 which act as locking means on rotation of the inner ring 1 during which at least one extension 23 butts against one end 25 of the flange 24.

Any relative rotation between the inner ring 1 and the guide sleeve 20 is thus prevented, which limits the relative wear of these parts in rubbing contact.

9 Claims, 4 Drawing Figures

CLUTCH THRUST BEARING UNIT WITH GUIDED ELASTIC SELF-ALIGNMENT

This invention concerns a clutch thrust bearing unit with guided elastic self-alignment for disc clutches and more especially for diaphragm clutches.

This kind of thrust bearing comprises a rolling bearing, for example a ball bearing, along with elastic means allowing for self-alignment of the thrust unit. A rigid guide sleeve sliding on a guide tube works in conjunction with the radial arm of one of the bearing races in such a manner as to prevent any uncontrolled movement of the thrust bearing during a clutch release operation and, on the contrary, to guide the movement of the rolling bearing in a radial plane during such an operation. The fact that elastic self-alignment means exist combined with the guidance provided by the rigid sleeve makes it possible to achieve radial movement of the thrust unit and of the rolling bearing which is in contact with the diaphragm on each clutch release operation.

In clutch thrust bearings of this type one of the two ball bearing race rings transmits the clutch release stresses by coming to bear directly against the diaphragm or by remaining continually in contact with it, whilst the other bearing ring takes the thrust from a control component or clutch release fork. The ring coming into or remaining in contact with the diaphragm, for example the outer bearing race ring generally has a toroidal bearing face, the thrust unit not being exactly centred on the gearbox shaft nor perfectly aligned with the rotational axis of the diaphragm. Furthermore the geometrical axis of the clutch diaphragm, its rotational axis and the axis of the gearbox shaft or guide tube do not always coincide exactly, which makes it necessary to provide for the thrust unit to be able to move at the time of each clutch release operation.

In clutch thrust bearing units with guided elastic self-alignment of this type, it is observed in practice that, when the thrust unit is working in clutch release operations, the bearing race which works in conjunction with the rigid guide sleeve is subjected to a rotational movement, notably due to the rotational torque transmitted by the rotating race of the ball bearing. This rotation of the bearing ring relative to the guide sleeve may lead to wear on these parts and so reduce the life of the clutch thrust bearing unit.

The aim of this invention is to avoid this drawback by providing a simple way of limiting the possibilities of relative rotation of the bearing ring compared with the guide sleeve.

The clutch thrust bearing with guided elastic self-alignment according to the invention comprises thin-walled inner and outer bearing rings, elastic means allowing self-alignment of the thrust unit and a rigid sleeve extending at least partially between the inner race ring a guide tube relative to which it can slide axially. The rigid sleeve comprises a radial annular guide section in rubbing contact with a radial arm of one of the bearing races in such a way as to provide guidance in a radial plane to the thrust unit motion during a clutch release operation, this motion being made possible by the presence of elastic self-alignment means. According to the invention, the rigid sleeve guide section possesses locking means limiting the rotational movement of the above-mentioned bearing race ring relative to the guide section of the rigid sleeve.

The radial arm of the bearing sleeve which works in conjunction with the rigid sleeve guide section possesses at least one extension which can work in conjunction with a means for locking the guide section, when the bearing race rotates.

In an advantageous embodiment the rigid sleeve guide section possesses at least one flange protruding axially in the direction of the above-mentioned bearing ring. This flange preferably extends to part of the edge of the guide section round the radial arm of the bearing ring, for example over one third of the perimeter. The ends of the flange are advantageously rounded to prevent the bearing race ring jamming during its self-alignment and rotational movement.

In another embodiment the guide portion of the rigid sleeve has at least one localized boss protruding in the direction of the bearing ring. This boss provides suitable locking in the case of rotation of the bearing ring relative to the guide sleeve.

This invention will be better understood through studying the detailed description of several embodiments taken as examples which are not in the least exclusive and are illustrated by the appended drawings, in which.

Figure 1:
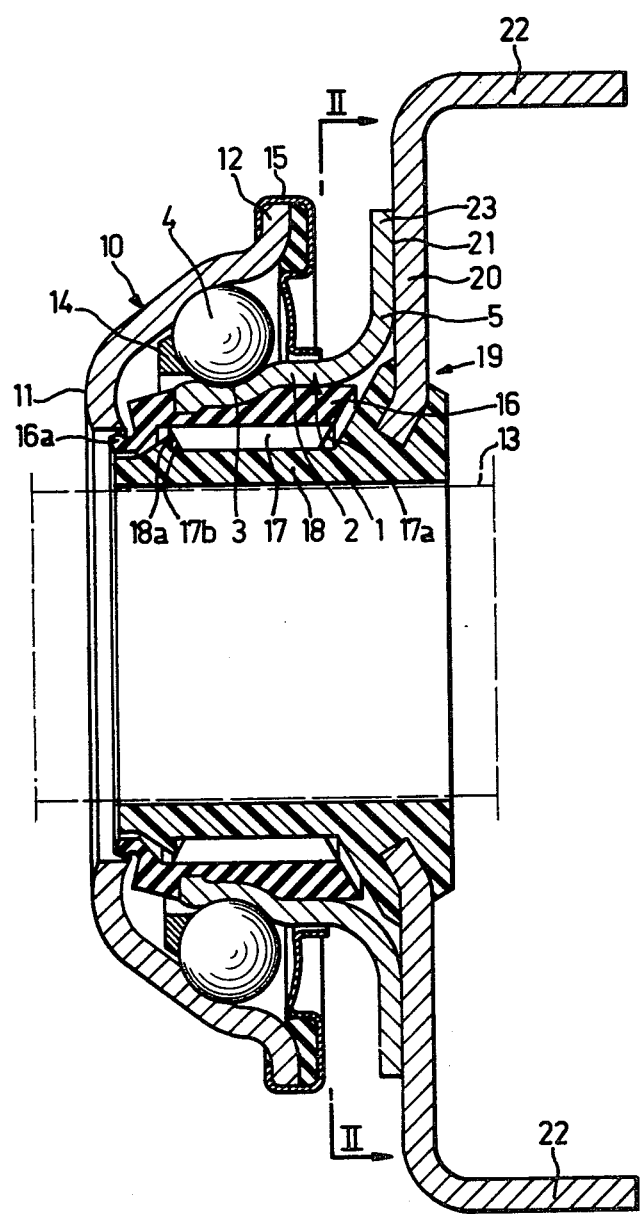
FIG. 1 is a section view of a thrust bearing according to the invention.
Figure 2:
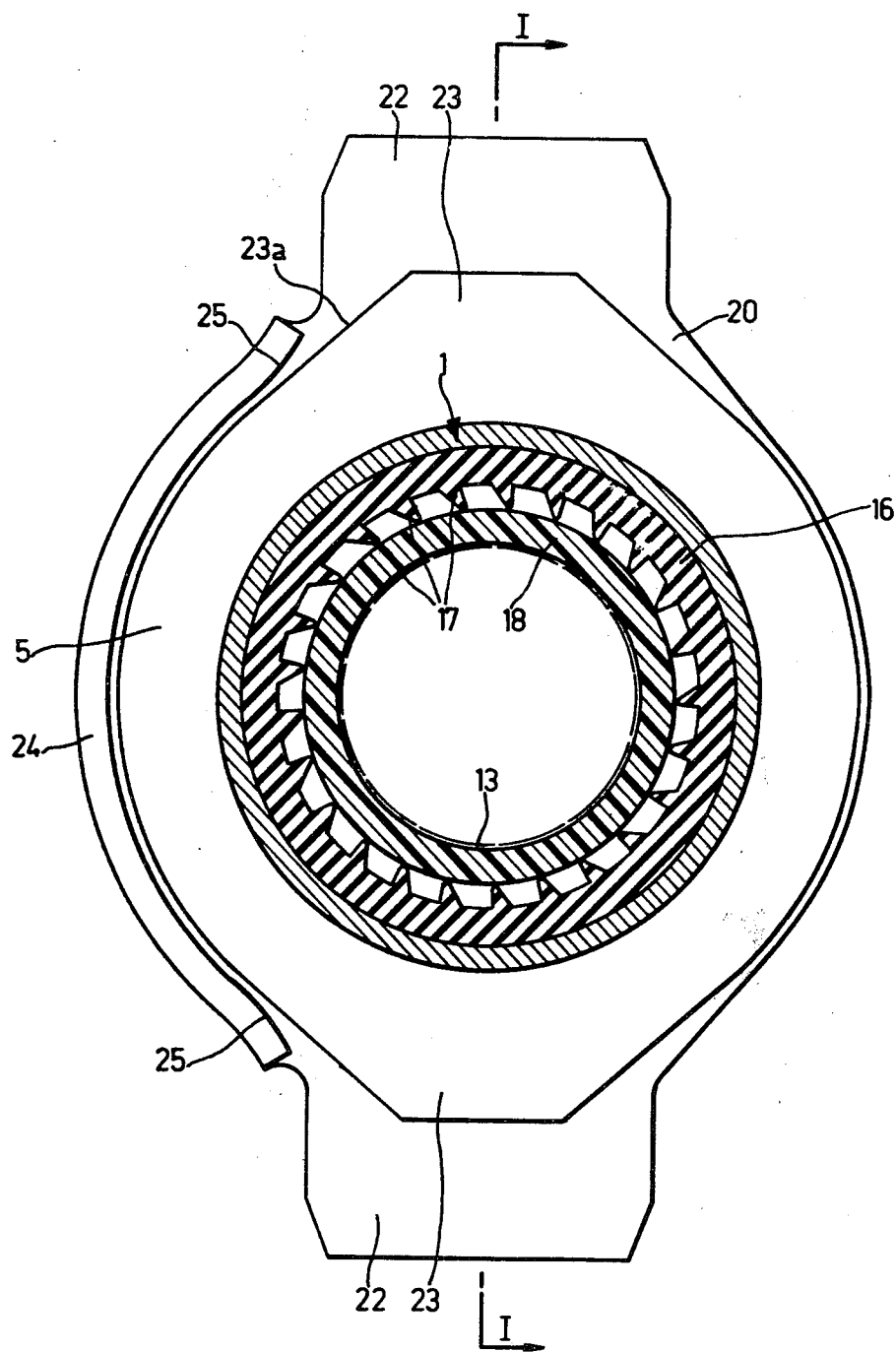
FIG. 2 is a section along II—II of FIG. 1 showing the various thrust unit components in the at-rest position.
Figure 3:
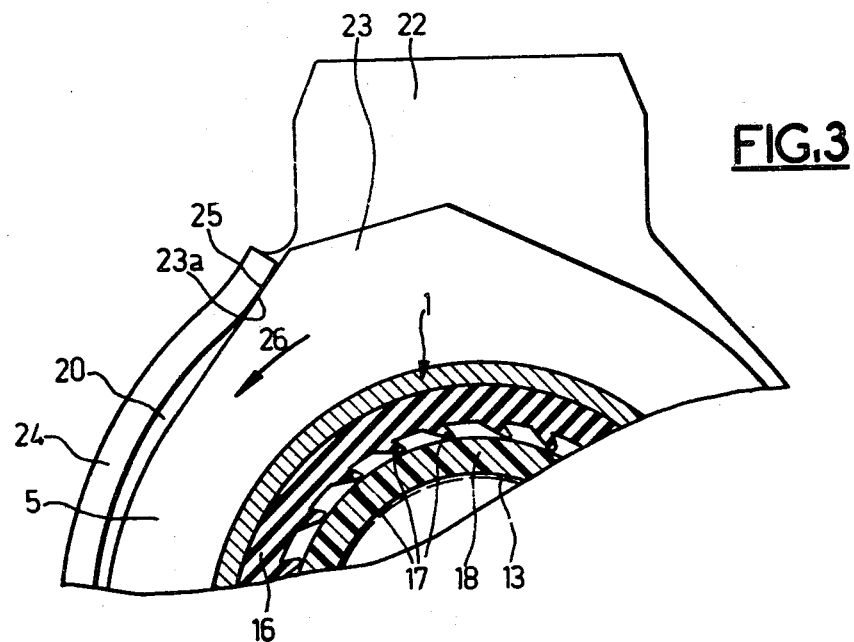
FIG. 3 is a similar view to FIG. 2 showing the operation of the locking means in rotational movement of the bearing race.

As it is shown in FIGS. 1 to 3, the clutch thrust bearing unit according to the invention comprises an inner thin-walled bearing ring 1 made by deep drawing a plate or a tube, possessing a tubular section 2 and a toroidal race way 3 for a row of balls 4. The tubular section 2 is extended outwards by a radial arm 5.

The clutch thrust unit ball bearing is completed by an outer ring 10, also thin-walled, made by deep drawing a plate or tube. The said outer ring comprises a toroidal section 11 which comes into contact with the surface of a diaphragm not shown in the figure when the thrust unit is moved longitudinally relative to the guide tube 13 shown by the broken line in FIG. 1, inside which the gearbox shaft rotates. The balls are held by a cage 14, the bearing being protected by a side plate 15 working with a radial annular section 12 pointing outwards from the outer ring 10.

A sleeve of elastic material 16, for example of elastomer or natural rubber, is located inside the tubular section 2 of the inner race ring 1. The elastic sleeve 16 comprises a multiple set of ribs 17 parallel to the thrust bearing centre line, pointing inside and slightly inclined relative to the radial direction, as can be seen in FIG. 2. In the embodiment illustrated the ribs 17 have a profile which gets thinner from the sleeve 16 to their free edge. The ribs 17 are also bevelled at both ends 17a and 17b in opposite directions as can be seen in FIG. 1.

The free edge of the ribs 17 comes into contact with a section of the outer surface of a cylindrical part 18 of a composite rigid sleeve marked 19 for the whole unit. An extension 16a of the elastic sleeve 16 works with the re-entrant inner end of the toroidal section 11 of the outer race ring 10 to provide a certain amount of sealing inside the bearing. An annular projection 18a working with the end 17b of the ribs 17 enables the thrust bearing unit fitted with its elastic sleeve 16 to be installed round the cylindrical part 18 and also enables these various parts to be held together in the form of a pre-installation assembly on the guide tube 13.

The rigid cylindrical part or sub-part is here made in moulded plastic with a filler. A cylindrical surface is thus obtained in sliding contact with the outer surface of the guide tube 13 which has low friction whilst also providing guidance for the longitudinal movement of the thrust bearing during each clutch release operation. The guide sleeve 19 is completed by a second part 20, annular in shape, made of metal and acting as a guide section. The said guide portion 20 comprises a radial surface 21 in rubbing contact with the radial arm 5 of the inner race ring 1.

The first cylindrical part 18 and the second annular part 20 forming the composite guide sleeve 19 are joined together and fixed by moulding the plastics material part 18 onto the metal part 20. The annular guide section 20 is extended out by two bent lugs 22 which are diametrically opposite and provide for the installation of a thrust release control component, not shown in the figures, like a clutch release fork which comes up against the surface of the annular guide part 20 which is opposite the radial surface 21 which comes into contact with the radial arm 5. The radial annular portion 20 also plays the role of rear end plate for the clutch thrust bearing unit. For this purpose it preferably undergoes a surface hardening treatment to prevent wear due to contact with the control or operating component.

As can be seen especially in FIG. 2 and FIG. 3, the radial branch 5 of the inner ring 1 comprises two diametrically opposite extensions 23 of trapezoidal shape. The radial arm 5, the overall profile of which is circular, thus comes into tangent contact with the trapezoidal profile of the two extensions 23 so setting up two areas of larger diameter.

In the embodiment shown in FIGS. 2 and 3, the guide section 20 has, over about ⅓ of its perimeter on one side of the centre line, a flange 24 protruding axially in the direction of the inner race 1. The two ends 25 of the flange 24 are rounded towards the outside in order to prevent jamming of the extensions 23 during a movement of self-alignment and rotation of the inner race ring 1.

During a clutch release operation for which the thrust bearing must move radially relative to the guide tube in order to correct an aligment defect, as shown in FIG. 3, the ribs 17 are made to deform. After a certain number of clutch release operations the inner ring 1 is rotated, for example in the direction of the arrow 26 in FIG. 3, owing to the various ribs 17 sloping in the other direction and to the rotational torque of the outer race ring 10 in contact with the diaphragm.

One of the rounded ends 25 of the flange 24 then comes into contact with the straight edge of one of the extensions 23. The rotational movement of the inner ring 1 is blocked, thus preventing any premature wear of the radial guide surface 21 in rubbing contact with the radial arm 5, with self-alignment of the clutch thrust bearing still remaining possible.

It will be noted that the radial dimensions of the extensions 23 must be large enough to come into locking contact with the rounded edges 25 acting as stops, even in the position of extreme movement of the thrust bearing during a clutch release operation requiring self-alignment. Furthermore, if the inner ring 1 is rotated in the other direction, it is the other extension 23 which comes into blocking contact with the other rounded end 25 of the flange 24 in order to stop this rotational movement.

Figure 4:
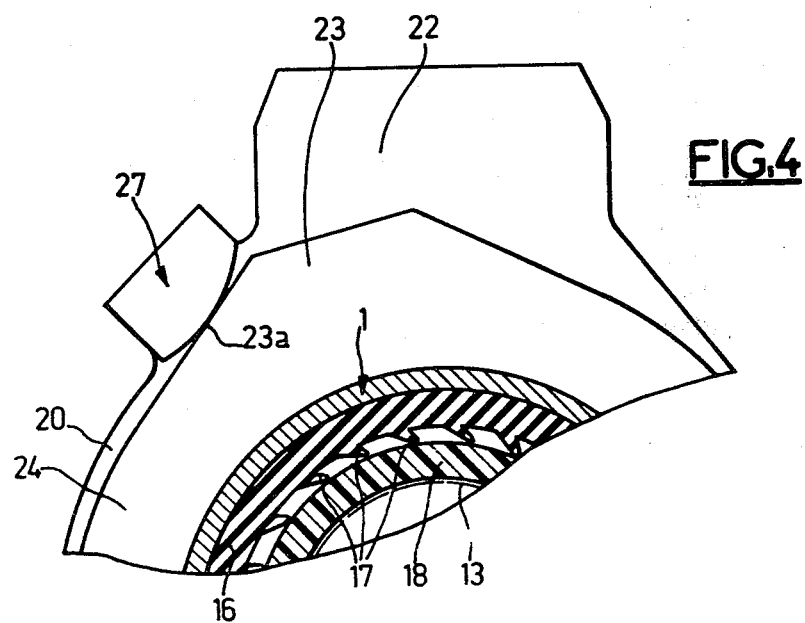
FIG. 4 is a part view similar to FIG. 3 of another embodiment of the invention.

In the embodiment in FIG. 4, in which the equivalent parts are given the same reference numbers, the guide part 20 simply has at least one boss 27 protruding in the axial direction towards the inner race ring 1 and thus capable of coming into blocking contact with the straight edge 23a of an extension 23. The active section of the boss 27 coming into blocking contact with the extension 23 is preferably rounded.

In the embodiment illustrated in FIG. 4, the boss 27 is made by cutting the plate forming the annular guide portion 20 and bending the material towards the inner ring 1. Of course, such a boss could be made differently, for example by simply drawing the material forming the guide section 20 so as to form a deformation directed axially towards the inner race ring 1.

It would also be possible to provide two symmetrical bosses on either side of the shaft instead of the single boss shown in FIG. 4.

In all cases, it will be noted that the elements which act as a stop during the rotational movement of the inner ring 1 are located near the base of the bent lugs 22. This is particularly the case of the bosses 27 and the ends 25 of the flanges 24. In this way the extensions 23 can also be provided in a section of the radial arm 5 which is roughly lined up with the lugs 22. The rotational movement of the inner ring 1 is therefore limited, with the extensions 23 coming into contact, after a small angle of rotation of the ring 1, with the locking elements formed either by the ends 25 of the flanges or by the bosses 27, or by any other equivalent method.

We claim:

1. A guided self-aligning clutch release bearing mountable on a guide tube in a clutch assembly, comprising:

an anti-friction bearing with rolling parts;

an outer bearing-race ring and an inner bearing-race ring slidably axially with respect to the guide tube, one of said bearing-race rings having a first radial flange having two diametrically opposite radial extensions;

an elastic sleeve on the interior of said inner bearing-race ring, having a plurality of resilient internal projections substantially parallel to the bearing center line, sloping relative to the radial direction;

a rigid guide socket having at least a portion thereof lying radially inwardly of the inner bearing-race ring and in direct slidable contact with the guide tube, said portion being also in direct external contact with said resilient projections, said guide socket having a second radial flange in frictional guiding contact with the first radial flange of said one bearing-race ring, said internal projections of said elastic sleeve comprising means for permitting radial movement of said inner bearing-race ring and for restoring said inner bearing-race ring to concentric relation with the portion of said guide socket which is contacted by said projections, and at least one stop means protruding axially in the direction of the bearing and adapted to contact one of said radial extensions upon rotation of said one bearing-race ring, said stop means being disposed where it will not jam the movement of the radial flange toward the stop means.

2. A clutch release bearing according to claim 1 wherein said first radial flange and said stop means are disposed so that, when they are in mutual contact, radial movement of the inner bearing-race ring toward the stop means will produce sliding movement of the radial flange on the stop means, said sliding movement being oriented tangentially relative to said bearing-race rings.

3. A clutch release bearing according to claim 1 wherein the stop means extends around a portion of the perimeter of the radial flange of the guide socket, said stop means having convex end portions for contacting the radial extensions on the first radial flange to limit the rotation of said radial extensions relative to said radial flange of the guide socket.

4. A clutch release bearing according to claim 3 wherein said first radial flange and said stop means are disposed so that, when they are in mutual contact, radial movement of the inner bearing-race ring toward the stop means will produce sliding movement of the radial flange on the stop means, said sliding movement being oriented tangentially relative to said bearing race rings.

5. A clutch release bearing according to claim 3 wherein said second radial flange has two diametrically opposite radial extensions, said stop means being located where it will prevent said radial extensions of said first radial flange from rotating beyond said radial extensions of said second radial flange.

6. A clutch release bearing according to claim 5 wherein said stop means extends circumferentially between the two radial extensions of said second radial flange, said stop means having opposite ends for contacting said radial extension of the first radial flange, said opposite ends being located near the edges of said radial extensions of the guide socket.

7. A clutch release bearing according to claim 1 wherein the stop means includes at least one localized boss which has a convex surface for contacting the radial extension of the first radial flange.

8. A clutch release bearing according to claim 1 wherein said second radial flange has two diametrically opposite radial extensions, said stop means being located where it will prevent said radial extensions of said first radial flange of said bearing race rings from rotating beyond said radial extensions of said second radial flange.

9. A clutch release bearing according to claim 8 wherein said stop means is located near the edge of one of said extensions of the second radial flange.

* * * * *